United States Patent
Kotecha et al.

(10) Patent No.: US 7,895,556 B2
(45) Date of Patent: Feb. 22, 2011

(54) METHOD FOR OPTIMIZING AN UNROUTED DESIGN TO REDUCE THE PROBABILITY OF TIMING PROBLEMS DUE TO COUPLING AND LONG WIRE ROUTES

(75) Inventors: Pooja M. Kotecha, Beacon, NY (US); David J. Hathaway, Underhill, VT (US); Louise H. Trevillyan, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/942,990

(22) Filed: Nov. 20, 2007

(65) Prior Publication Data

US 2009/0132982 A1    May 21, 2009

(51) Int. Cl.
*G06F 17/50* (2006.01)

(52) U.S. Cl. .................. 716/108; 716/113; 716/114

(58) Field of Classification Search .................. 716/1–6, 716/108, 113, 114
See application file for complete search history.

(56) References Cited

U.S. PATENT DOCUMENTS

| 6,795,951 | B2 | 9/2004 | Hathaway et al. | |
|---|---|---|---|---|
| 2003/0177455 | A1* | 9/2003 | Kaufman et al. | 716/2 |
| 2008/0276210 | A1* | 11/2008 | Albrecht et al. | 716/6 |

* cited by examiner

*Primary Examiner*—Paul Dinh
(74) *Attorney, Agent, or Firm*—H. Daniel Schnurmann

(57) ABSTRACT

A method and a system is described to predict effects of coupling on timing by estimating the delta delay and delta slack that can occur due to coupling on any net, for optimization to minimize the sensitivity of slack to potential coupling violations. The invention protects against other unexpected increases in effective load capacitance, such as those due to unexpectedly long wire routes. It also estimates the delay impact of a single 'fault' or 'event', such as a coupling event or unexpectedly long wires routes, including the impact of slew propagation.

18 Claims, 5 Drawing Sheets

METHOD FOR OPTIMIZING AN UNROUTED DESIGN TO REDUCE THE PROBABILITY OF TIMING PROBLEMS DUE TO COUPLING AND LONG WIRE ROUTES

FIELD OF THE INVENTION

The present invention generally relates to very large scale integrated (VLSI) circuit designs, and more particularly, to a system and method for setting up a timing environment for use during early optimization stages to capture timing effects caused by long wires routes and coupling.

BACKGROUND OF THE INVENTION

Timing optimization of a logic network is typically performed using an integrated incremental timing analyzer, and is invoked at different stages of the design process, e.g., before placement, and after placement and routing. A benefit of this approach is that the design changes that are required to correct large problems can be made before subsequent expensive design stages such as placement and routing, reducing the computational expense that would otherwise be required to incrementally update the design decisions made during these subsequent processes.

Coupling between nets can affect the timing of a logic network, and its impact on the timing analysis must be assessed to drive timing optimization. During coupling, pairs of nets are considered, in which one net is an "aggressor," on which a signal transition can, through capacitive or inductive coupling, alter the timing of a transition on another "victim" net. By way of example, U.S. Pat. Nos. 6,615,395 and 6,651,229 provide more details on the effect of coupling to the static timing analysis.

Coupling is the cause of both timing violations (failure of signals to meet timing requirements) and electrical violations (e.g., excessive signal slew and transition time or excessive effective load capacitance on a driver). The majority of those violations can be repaired by simple techniques, such as sizing up the driver gate of the victim net.

True coupling analysis requires information about nets being coupled (i.e., which pairs of nets are in close proximity of each other to interact), hence coupling violations can only be identified accurately after routing and electrical parasitic extraction. Even when routing information is available, it is difficult and expensive to incrementally update the impact of certain effects, like coupling on the timing results. Methods have been proposed to efficiently approximate these coupling effects during incremental static timing, as described, e.g., in U.S. patent application Ser. No. 11/420,529, herein incorporated by reference in its integrity. However, these methods still cannot operate until routing has been performed.

Post-routing timing closure (optimizing or modifying a design to correct all the timing violations) is becoming one of the biggest turn-around-time (TAT) detractors in today's chip design. Coupling plays a major role in causing a large number of post-routing timing violations. Design "sign-off" requires that all such violations be corrected prior to releasing the design to manufacturing. To achieve an acceptable TAT, it is necessary to identify and repair such sign-off level effects early in the design process.

In the physical synthesis phase, design decisions are made at a given design stage based on predictions of the timing values that are to be determined after the design process is complete. For example, before placement, timing estimation must anticipate the effects of placement and routing that have not yet been performed, and to that end, various wire load models (e.g., estimated wire capacitance and resistance based on net fan-out) are used to approximate the timing. Similarly, when circuits have been placed but not routed, estimated Steiner routes can be used to predict the later timing impacts of actual wiring. While Steiner estimates are generally close to the final routing results, on occasion, the actual routes can be significantly longer than predicted, e.g., due to the need to route around blockages or congestion. A wire route for a net may be considered "long" if its total length (the sum of the lengths of all segments of the wire route) exceeds by more than some specified amount (e.g., 30%) an estimate of that net's total length made before routing. The process of predicting timing and electrical effects of subsequent design steps is not new to timing/design closure, but it is important that these estimates be as accurate as possible while not requiring excessive computation expense.

The increased effective capacitance of a net due to coupling or long wire routes not only affects the delay of that net and its driver, but also increases or degrades the slew (the time the signal takes to make a transition) at the gate output and net sink. Because gate delays and output slews are typically functions of input slew, any increase in the input slew of a gate due to coupling or long wire routes will also have a propagated effect on the delays of gates in the fan-out cone of the affected net.

Three approaches exist to predict timing effects of long wires or coupling early in the design process:

1. One can assume coupling/long wire routes for all the nets in the design, but this is highly pessimistic and can lead to considerable over-design and/or difficulty in closing timing.
2. One can include some built-in pessimism in the electrical parasitic extraction parameters used with estimated Steiner routes to take into account potential coupling capacitance or long wire routes that cannot be known until later in the design process. These default estimates for capacitance per micron of wire length have coupling capacitance and long routing effects taken into account. To avoid excessive pessimism, where inbuilt pessimism typically accounts for only a fraction of the potential impact of a true coupling event or long wire route on any net, and hence can be optimistic for short paths, with the cumulative impact of these pessimistic electrical parameters still less than the impact of a single true coupling event or long wire route. It also fails to account for the delay impacts of propagated slew degradation due to a coupling event or a long wire route.
3. The fault-tolerant static timing analysis approach described in U.S. Pat. No. 6,795,951 can capture the local impact of a predetermined number of coupling events and/or long wire routes along any path, but is expensive due to duplication of the timing graph. It takes into account propagated effects, but the cost is 2N+1 times the regular work, where N is the number of 'faults' or 'events' that may be considered along any timing path.

OBJECTS AND SUMMARY OF THE INVENTION

Accordingly, it is an object of the present invention to predict the effects of coupling on timing by estimating the delta delay and delta slack that could occur due to coupling on any net.

It is another object to optimize the design by minimizing the sensitivity of the slack to potential coupling violations by estimating the timing impact of long wire route on a propagation path, including propagated impacts due to slew degradation.

It is still another object to predict slacks that can show up after detail routing and coupling analysis due to unusual coupling or long wire route impacts.

It is yet another object to enable an earlier correction of potential timing problems, reducing post-routing coupling violations, so that they are less prone to repairs that become necessary later in the design process when changes are harder to make.

In one aspect of the invention the effects of coupling on timing are measured by estimating the delta delay and delta slack that could occur due to coupling on any net. It estimates the effect of coupling so that optimization can minimize the sensitivity of slack to potential coupling impacts. The invention also protects against other unexpected increases in effective load capacitance, such as those due to unexpectedly long wire routes. It can estimate the delay impact of a single 'fault' or 'event' (e.g., a coupling event or unexpectedly long wire), including impacts of slew propagation. It does so without requiring duplication of the delay graphs.

In another aspect of the present invention, a system and a method are provided by which timing analysis can anticipate likely effects of coupling, before a detailed routing and coupling analysis. This method is of greatest importance in early optimization, where timing is typically based on Steiner routing estimates for nets (i.e., a rectilinear wire routes for nets computed without considering blockage or congestion due to other nets).

In still another aspect of the invention, there is provided a method and a system of estimating in an unrouted integrated circuit (IC) design, potential timing effects of at least one of coupling effects and long wire routes due to wire routing, said unrouted IC design being described as a netlist including at least one net having a source and at least one sink, the method including the steps of: a) determining a delay change (TotalDeltaDelay) detected at the at least one sink of the at least one net, the delay change including the effect of slew degradation; and b) determining whether a difference between the TotalDeltaDelay and a slack of the at least one sink is smaller than a threshold; and if the slack is smaller than the threshold, then modifying the unrouted IC design by at least of one of: i) decreasing the TotalDeltaDelay of the at least one sink, and ii) increasing the slack of the at least one sink.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention

DETAILED DESCRIPTION OF PREFERRED EMBODIMENTS

Figure 1:
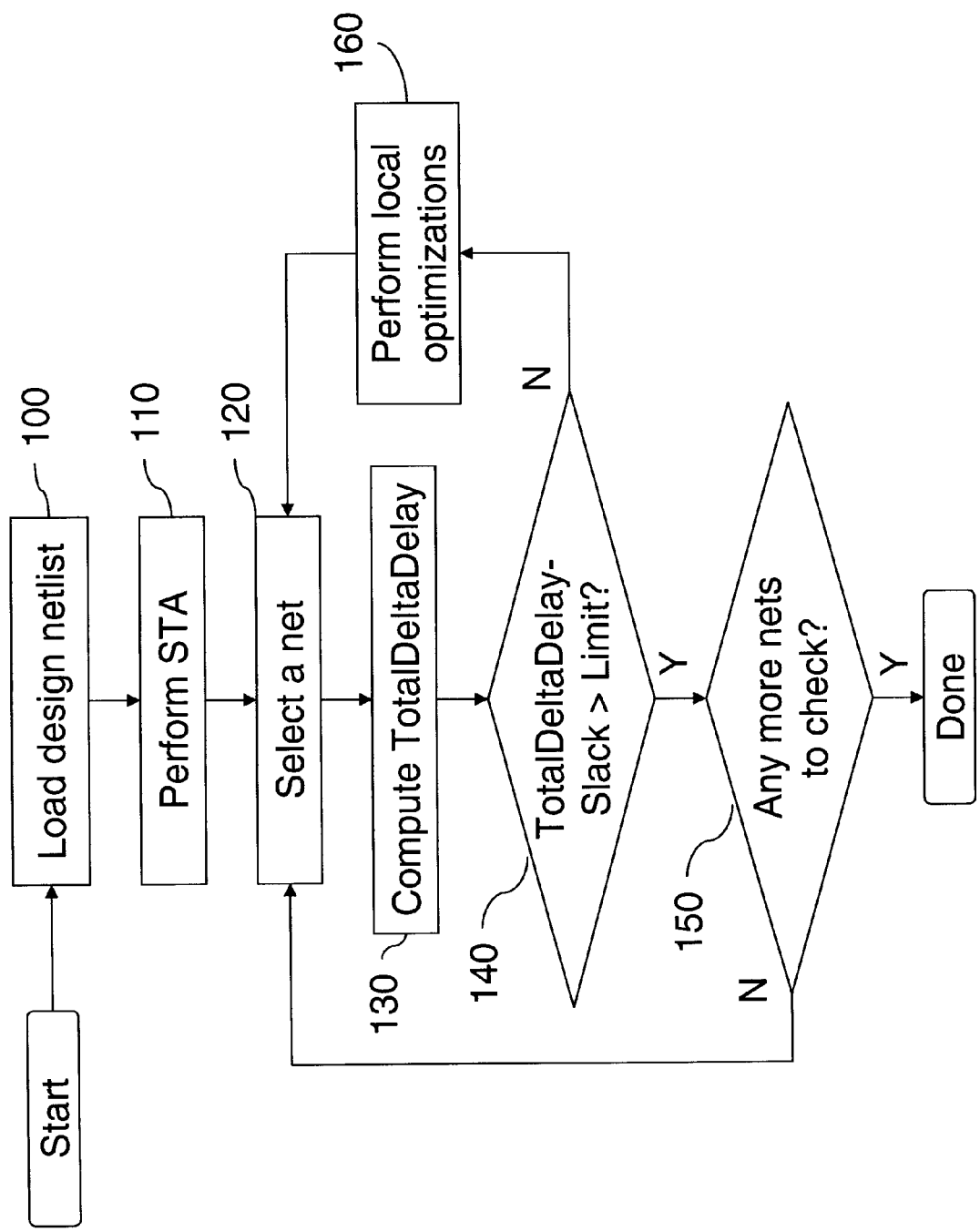
FIG. 1 is a flowchart illustrating a timing closure process embodying the inventive method.

The present invention and the various features and advantageous details thereof are explained more fully with reference to the non-limiting embodiments that are illustrated in the accompanying drawings and detailed in the following description.

The present inventive method computes before routing a change in delay, hereinafter referred to as TotalDeltaDelay that could reasonably be expected to occur due to coupling, long wire routes, or other characteristics of a net that might be discovered after routing has been performed. Further, TotalDeltaDelay also includes the anticipated downstream delay that increases due to the slew degradation propagation. Coupling problems occur often enough that in order to prevent "surprise" problems after routing, it becomes necessary to ensure that any single "typical" coupling problem will not cause timing or electrical problem. Yet, coupling problems occur infrequently enough that it is sufficient to assume during pre-routing optimization that only a single such problem will occur on any path. Thus, the inventive method attempts to ensure that TotalDeltaDelay for every net is less than the slack margin (positive slack) of the net, and hence of all paths in which the net occurs.

Static timing analysis (STA) algorithms operate by first levelizing the logic structure, and breaking any loops in order to create a directed acyclic graph (timing graph). Each delay edge of the timing graph has a source node and sink node, and the sources of a node are the source nodes of its in-edges, while the sinks of a node are the sink nodes of its out-edges. Typically, a timing graph node is associated with every cell input and output pin, and delay edges are associated with net source to sink connections and with input to output paths in cells through which signal transitions can propagate. Modern designs can often contain millions of placeable objects, with corresponding timing graphs having millions, if not tens of millions of nodes. For each node, a corresponding arrival time, transition rate (slew), and required arrival time may be computed for both rising and falling transitions as well for both early and late mode analyses. An arrival time (AT) represents the latest or earliest time at which a signal can transition due to the entire upstream fan-in cone. The slew value is the transition time (e.g., the time it takes the signal to transition from 10% of its final voltage to 90% of its final voltage) associated with a corresponding AT. Furthermore, a required arrival time (RAT) represents the latest or earliest time at which a signal must make a transition due to timing constraints in the entire downstream fan-out cone.

AT's are propagated forward in a levelized manner, starting from the chip primary input asserted (i.e., user-specified) arrival times, and ending at either primary output ports or intermediate storage elements. AT level numbers are assigned such that the AT level of a node is one greater than the largest AT level of any of its source nodes, or zero if it has no source nodes and, thus, the AT level of a node is the maximum number of delay edges between that node and any primary input of the design. For single fan-in cases, AT sink node=AT source node+delay from source to sink.

Whenever multiple signals merge, each fan-in contributes a potential arrival time computed as AT sink(potential)=AT source+delay.

Then the maximum (late mode) or minimum (early mode) of all potential arrival times is retained. RATs are computed in a backward levelized manner starting from either asserted required arrival times at chip primary output pins, or from tests (e.g., setup or hold constraints) at internal storage devices. RAT level numbers are assigned such that the RAT level of a node is one greater than the largest RAT level of any of its sink nodes, or zero if it has no sink nodes. Thus, the RAT level of a node is the maximum number of delay edges between that node and any primary outputs or timing constraints (setup or hold tests) of the design. For single fan-out cases, RAT source node=RAT sink node−delay.

When multiple fan-outs merge (or a test is present), each fan-out (or test) contributes a prospective RAT, and the minimum (late mode) or maximum (early mode) required arrival time is retained. The difference between the arrival time and required arrival time (RAT−AT in late mode, and AT−RAT in early mode) is referred to as slack. A positive slack implies that the current arrival time at a given node meets all downstream timing constraints, and a negative slack implies that the arrival time fails at least one such downstream timing constraint.

Referring now to FIG. 1, the design optimization or correction process of the invention begins with step 100 by loading a design netlist. A conventional static timing analysis is then performed in step 110 using estimated net capacitances. In step 120, an iterative process of checking and correcting nets is initiated by selecting a first net on which to operate. This selection can be done by simply selecting, one by one, all nets of the design, or it can be restricted to nets with a slack that is less than some specified threshold. As local optimizations are performed in step 160, as will be described hereinafter, successive executions of net selection of step 120 can also optionally repeat the selection of previously selected nets to verify that changes have not caused a previously checked net to become problematic. Because of the nature of the optimizations performed, however, this will generally not be needed, as these optimizations will normally only reduce slew values and therefore make nets less likely to encounter timing problems due to coupling or long net routes.

Continuing to step 130, a TotalDeltaDelay is computed for the selected net, and more specifically, for each sink of the selected net, using a process that will be described in more detail hereinafter. This TotalDeltaDelay is the change in delay that might be expected due to coupling or long wire routing of the net. The slack of each sink of the selected net is then subtracted from the TotalDeltaDelay value computed for that sink and compared against a limit in step 140. This limit is normally set at zero, but other user-specified values can also be used.

If the check in step 140 is satisfied, the process proceeds to step 150 wherein an inspection is made to determine if any more nets need to be checked. As already stated, the set of nets to be checked can be determined in different ways, and can include repeated checking of some nets. If additional nets need to be checked the process then the process returns to step 120 to select another net to check. Otherwise, the process ends.

Returning to step 140, if the check is not satisfied, it indicates that there is a potential for a coupling event or long wire route on the selected net sufficient to cause a timing problem. In this case, the process proceeds to step 160 to perform local optimizations to reduce the slew of the selected net, which will in turn tend to decrease the TotalDeltaDelay for the net, and/or to reduce the delay of the net of the cell feeding it and/or of other cells in paths to and from the selected net, in order to increase the slack of the sinks of the selected net. Many different types of optimizations can be performed to improve the slew at the net sinks or the delays along paths to and from these sinks, which are known to those skilled in the art. These optimizations include but are not limited to: increasing the drive strength of the net source cell, adding buffers in series with a sink to reduce slews and delays of long nets, adding buffers to side sinks to reduce loading (and hence delays and slews) of long nets, and moving cells to reduce the expected length of the net (and hence the potential increase in its effective capacitance due to coupling or unexpectedly long wire routes).

Figure 2:
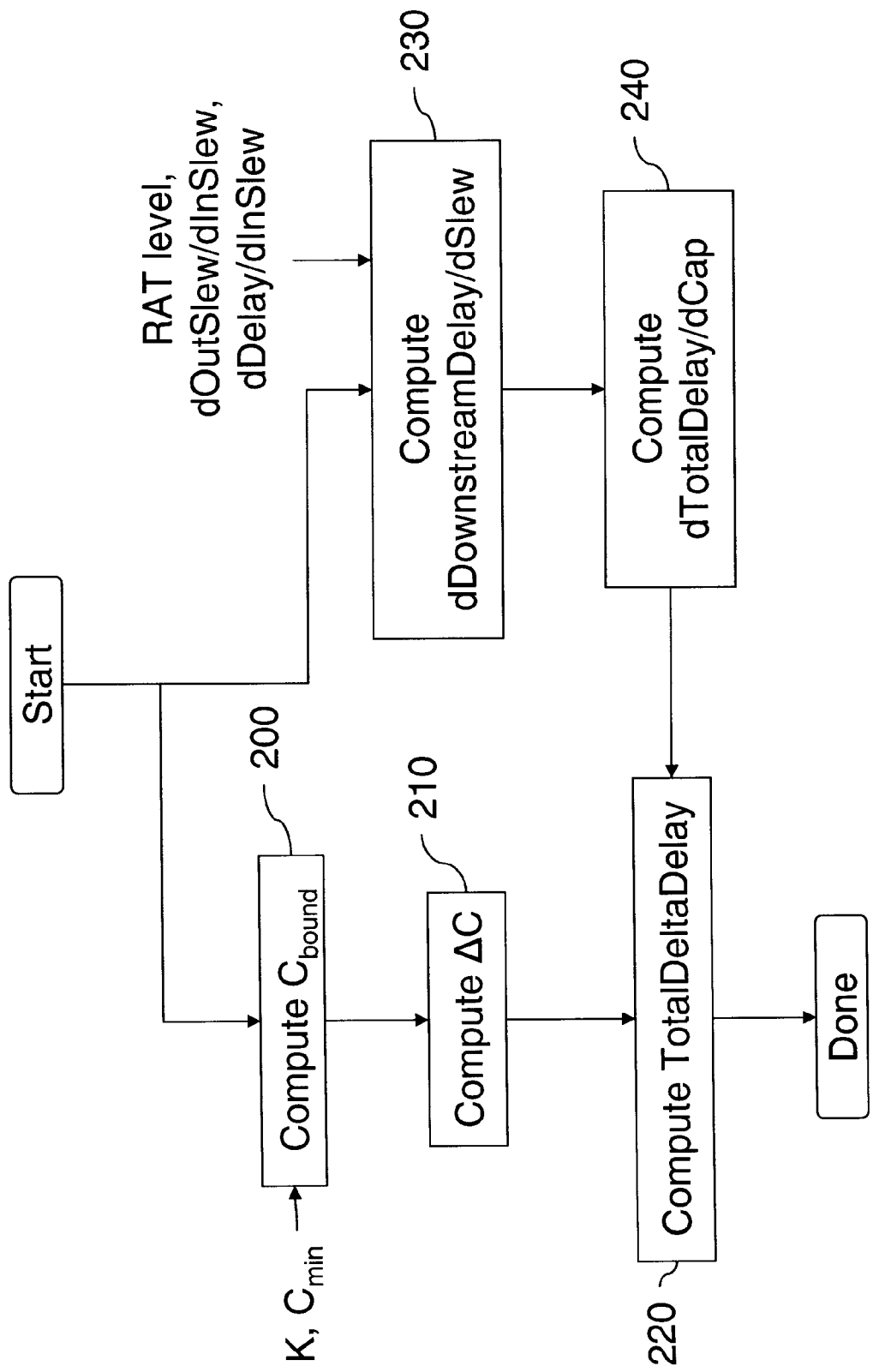
FIG. 2 is a flowchart illustrating the computation of a TotalDeltaDelay value for a net.

The TotalDeltaDelay computation for a selected net in step 130 can be better understood by reference to FIG. 2. In step 200 a Cbound value is computed, which is the maximum expected capacitance for the net, including potential increases due to coupling and/or unexpectedly long wire routes. The Cbound is computed as a function of Cestimate, which is the "current" estimated capacitance of the net (e.g., from a Steiner route estimate), not including potential coupling or long wire routes.

Figure 3:
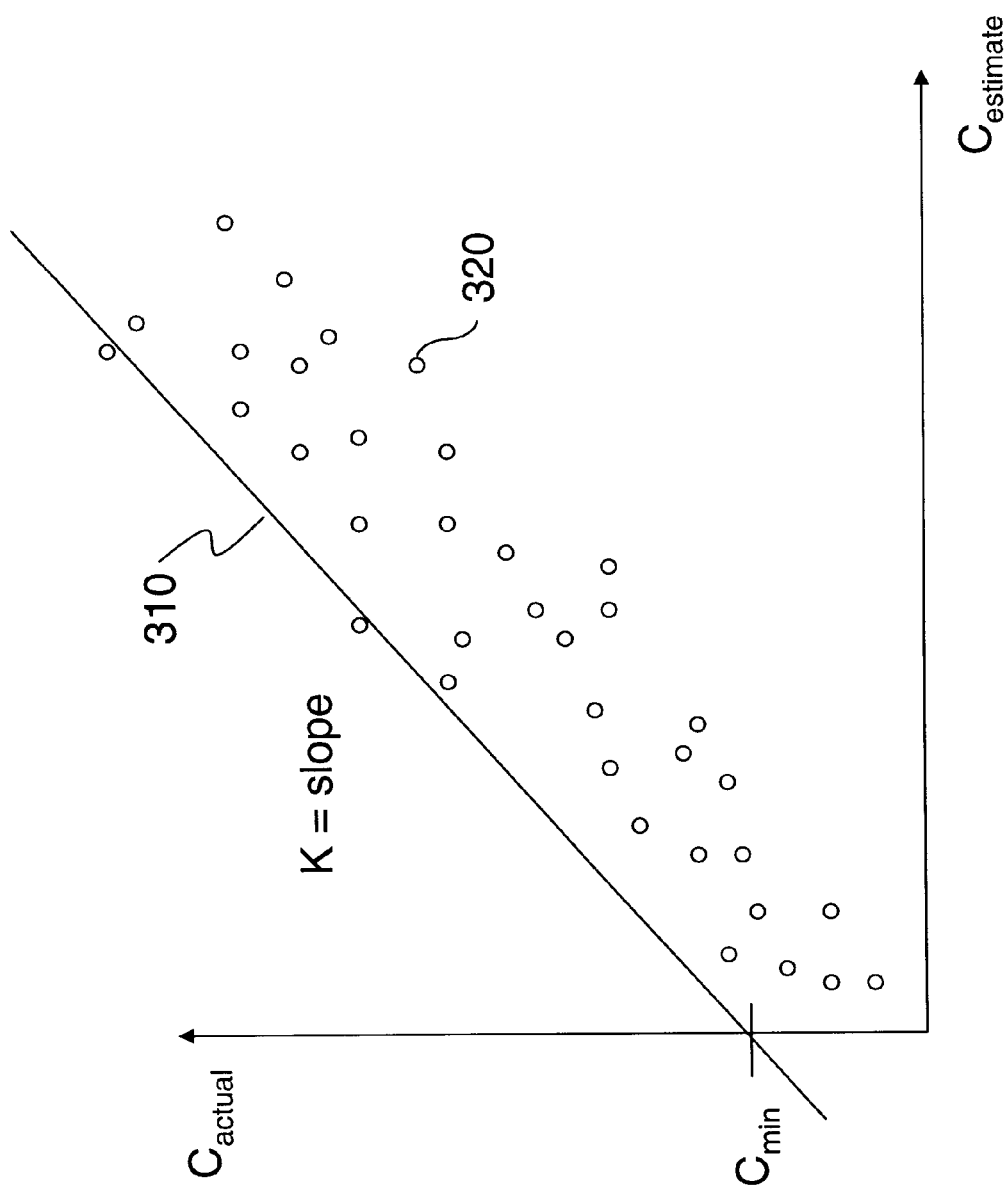
FIG. 3 is a plot of Cactual versus Cestimate for a collection of nets.
Figure 4:
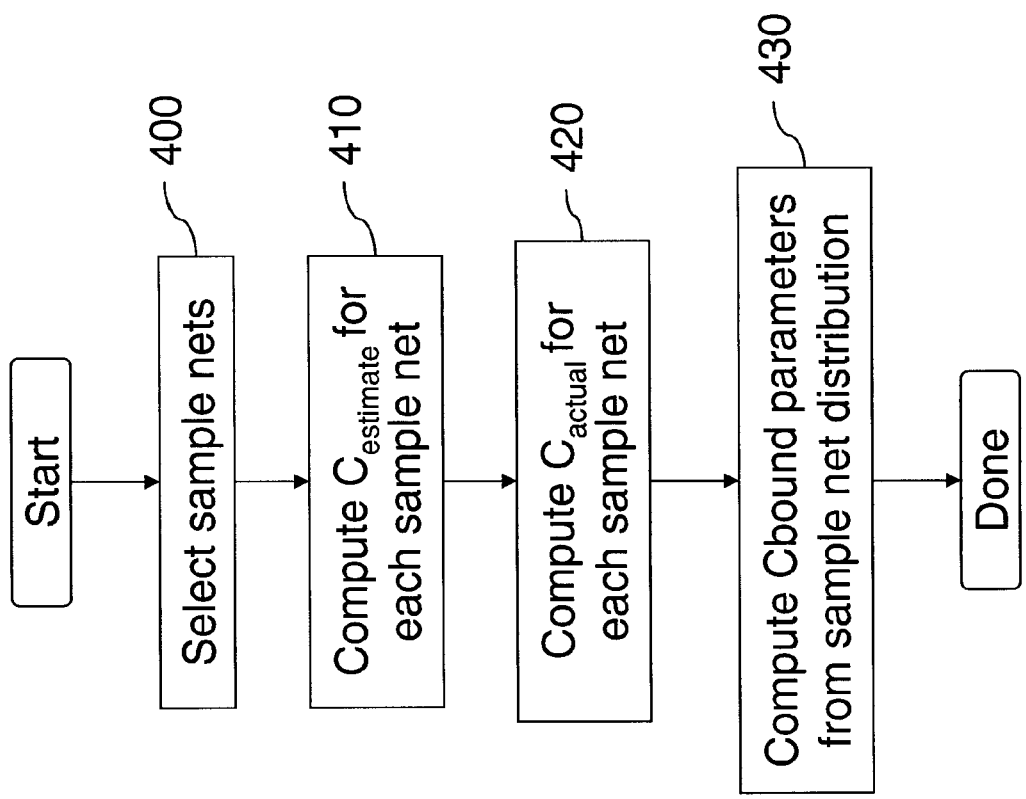
FIG. 4 is a flowchart illustrating the computation of K and Cmin values used to compute Cbound.

One method for deriving a function Cbound (Cestimate) is illustrated in FIG. 4. In step 400, a large set of sample nets is selected. These might be nets from previously implemented designs which have already been routed, and for which both estimated and actual effective capacitance information can be determined. In Step 410, a Cestimate value is computed or obtained (e.g., from data stored during the design of the chip from which the sample net was taken) for each sample net. In step 420, a Cactual value is computed or obtained for each sample net based on an actual routing of the net, and including potential coupling effects. FIG. 3 shows a plot of Cactual vs. Cestimate for such a set of sample nets, where each point 320 represents one net. In step 430 parameters for a Cbound (Cestimate) function are computed. A particular form of Cbound function, shown as line 310 in FIG. 3, is:

Cbound(Cestimate)=Cmin+K*Cestimate, with parameters K and Cmin. Such parameters can be determined using statistical methods well known to those skilled in the art, such that, for an arbitrary net with the estimated capacitance Cestimate and actual effective capacitance Cactual (including coupling and routing), the probability that Cbound (Cestimate)≧Cactual is greater than some desired threshold (e.g., 99.9%). It is worth noting that the more completely bounding function is, the more pessimistic it will be (more nets for which it will predict possible coupling problems). Thus, the bound should be chosen to balance overdesign due to pessimistic estimations and escapes (problems that are allowed to slip through and appear after routing). Ideally, the fitting should preferably be done in a way that would allow it to be scaled to new technologies, i.e., capture characteristics of the wiring routes and coupling probabilities, and be adjustable for different grounded and coupling capacitance per unit length estimates.

Returning to FIG. 2, after Cbound is computed in step 200, the method proceeds to step 210, in which DeltaCap is computed, as Cbound−Cestimate. DeltaCap is the amount by which the net capacitance might be expected to increase due to coupling and/or long wire routes. Before, after, or in parallel with steps 200 and 210, the steps 230 and 240 are performed.

In step 230, a dDownStreamDelay/dSlew value is computed, which is an estimate of the change in delay of downstream gates (gates fed directly or indirectly by the net in question) due to propagated slew effects, per unit change in slew. To estimate dDownstreamDelay/dSlew, one can assume that each downstream gate or circuit has roughly the same dOutSlew/dInSlew and dDelay/dInSlew. These two derivatives are the expected derivatives of a gate output slew and gate delay, respectively, with respect to the gate input slew. They would typically have been previously computed by an analysis of the circuit library being used. This analysis would typically begin by finding these derivative values for various gates in the circuit library under specified conditions (e.g., at their maximum or average output load and with a maximum or average input slew), using delay rules for the library and either analytic or finite difference derivative computations, which are known to those skilled in the art. These individual gate values would then be combined to get dOutSlew/dInSlew and dDelay/dInSlew values by finding their average or some specified percentile values (e.g., 90%). Because gates in a digital design have gain, one can assume that dOutSlew/dInSlew will be <1.0. One approximate upper bound on dDownstreamDelay/dSlew can be computed by assuming that there is an infinite chain of downstream gates from the net sink under consideration. This gives (from the series limit):

$$\frac{dDownstreamDelay}{dSlew} = \frac{dDelay}{dInSlew} * \left(1 + \frac{dOutSlew}{dInSlew} + \left(\frac{dOutSlew}{dInSlew}\right)^2 \ldots\right)$$

$$= \frac{dDelay}{dInSlew}\left(1 - \frac{dOutSlew}{dInSlew}\right).$$

If it is known that there are only N downstream gates, one can instead compute a finite sum:

$$\frac{dDownstreamDelay}{dSlew} = \frac{dDelay}{dInSlew} * \left\{ \begin{array}{c} 1 + \frac{dOutSlew}{dInSlew} + \\ \left(\frac{dOutSlew}{dInSlew}\right)^2 \ldots + \left(\frac{dOutSlew}{dInSlew}\right)^N \end{array} \right\} =$$

$$\frac{dDelay}{dInSlew} * \frac{\left(1 - \frac{dOutSlew}{dInSlew^{N+1}}\right)}{\left(1 - \frac{OutSlew}{dInSlew}\right)}.$$

The maximum number of downstream stages can be determined from the RAT level, but it must be recognized that one gate, or "stage" of logic covers two RAT levels (for the input and output pins of the gate), so converting this to a RAT level-dependent form gives:

$d$DownstreamDelay/$d$Slew=$d$Delay/$d$InSlew*
   (1−$d$OutSlew/$d$InSlew$^{(RAT\_level/2)}$)/(1−$d$OutSlew/
   $d$InSlew), where RAT_level is that of the net sink pin, given that a primary output or data input of a latch or flip-flop has a RAT level of zero.

After dDownstreamDelay/dSlew has been computed in step 230, the method proceeds to step 240, in which dTotalDelay/dCap is computed. This is the expected change in delay of the gate driving the net, the net itself, and all downstream gates, including downstream effects of slew degradation, as a result of a unit increase in net capacitance, and is computed as:

$d$TotalDelay/$d$Cap=$d$DownstreamDelay/
   $d$Slew*$d$SourceAndWireSlew/$d$Cap+$d$SourceAn-
   $d$WireDelay/$d$Cap.

The first term accounts for the propagated effects of slew degradation, while the second term accounts for the immediate effects of the change in capacitance on the net and its driving gate. The dSourceAndWireSlew/dCap and dSourceAndWireDelay/dCap values used in this equation can be determined by analytic derivatives for the source gate delay and net delay, or by using finite difference derivative calculation from two delay calculations for the selected net and its source gate, where, for a small value epsilon ($\epsilon$)

$d$SourceAndWireSlew/$d$Cap=(SourceAndWireSlew
   ($C$estimate)−SourceAndWireSlew($C$estimate+
   epsilon))/epsilon and $d$SourceAndWireDelay/$d$Cap=(SourceAndWireDelay
   ($C$estimate)−SourceAndWireDelay($C$estimate+
   epsilon))/epsilon.

After steps 210 and 240 have been completed, the method proceeds to step 220 in which TotalDeltaDelay is finally computed as:

TotalDeltaDelay=$d$TotalDelay/$d$Cap*DeltaCap.

Figure 5:
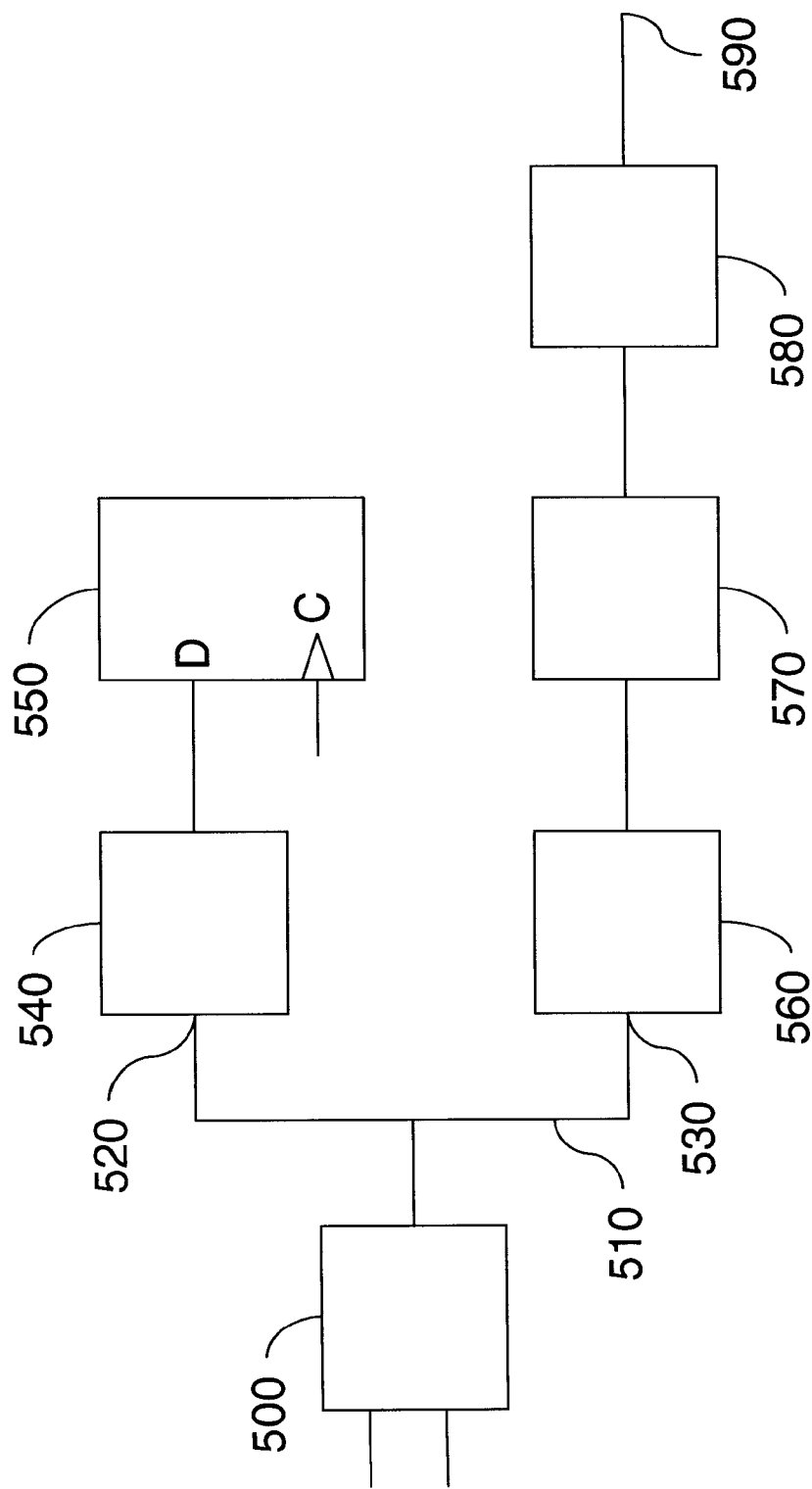
FIG. 5 is an exemplary circuit to which the inventive method is applied.

The operation of the TotalDeltaDelay calculation of FIG. 2 will now be further explained with reference to the exemplary circuit of FIG. 5. Assume that the following parameter values have been derived, as described previously, for a Cbound function and for characteristic library element delay and output slew derivatives with respect to input slew:

K=1.1,

Cmin=1.0, $d$OutSlew/$d$InSlew=0.3, and $d$Delay/$d$InSlew=0.2.

Further assume that parameters for net 520 are:

Cestimate=2.0, $d$SourceAndWireDelay/$d$Cap=0.5, and $d$SourceAndWireSlew/$d$Cap=1.0.

Applying the method to sink 520 of net 510, in step 200 Cbound is computed as Cmin+K*Cestimate=1.0+1.1*2.0=3.2, and in step 210 DeltaCap is computed as Cbound−Cestimate=3.2−2.0=1.2. In step 230, dDownStreamDelay/dCap is computed using the RAT_level value of 2 for sink 520, as:

$$\frac{dDownstreamDelay}{dSlew} = \frac{dDelay}{dInSlew} * \frac{\left(1 - \frac{dOutSlew}{dInSlew^{(RAT\_level/2)}}\right)}{\left(1 - \frac{dOutSlew}{dInSlew}\right)}$$

$$= 0.2 * \frac{(1 - 0.3^{(2/2)})}{(1 - 0.3)}$$

$$= 0.2.$$

In step 240 dTotalDelay/dCap is computed as $$\frac{dTotalDelay}{dCap} = \frac{dDownstreamDelay}{dSlew} * \frac{dSourceAndWireSlew}{dCap} + \frac{dSourceAndWireDelay}{dCap}$$

$$= 0.2 * 1.0 + 0.5 = 0.7.$$

Finally, in step 220 TotalDeltaDelay is computed as:

TotalDeltaDelay=dTotalDelay/
dCap*DeltaCap=0.7*1.2=0.84.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention can be used for many applications. Thus, although the description is made for particular arrangements and methods, the intent and concept of the invention is suitable and applicable to other arrangements and applications. It will be evident to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of determining in an unrouted integrated circuit (IC) design, timing effects and coupling effects, said unrouted IC design being described as a netlist including at least one net having a source and at least one sink, the method comprising:
   a. by using a computer, determining a delay change (TotalDeltaDelay) for at least one sink of said at least one net, said delay change comprising propagated effects of slew degradation;
   b. determining whether a difference between said TotalDeltaDelay and a slack of said at least one sink is smaller than a threshold; and
   c. if said slack is smaller than said threshold, then modifying said unrouted IC design by at least of one of: i) decreasing the TotalDeltaDelay of said at least one sink, and ii) increasing said slack of said at least one sink, wherein said propagation effects of slew degradation comprises estimating delay changes in downstream gates, wherein said estimation of downstream gate delay increases when excluding propagating timing values from said at least one sink.

2. The method of claim 1, wherein said TotalDeltaDelay determination comprises computing anticipated changes in characteristics of said at least one net as a result of said routing.

3. The method of claim 1, wherein said netlist comprises timing graph nodes associated with input and output pins of at least one cell, delay edges being associated with net-source-to-sink connections, and input-to-output paths of said cells through which signal transitions propagate.

4. The method of claim 1, wherein step a) is preceded by performing a static timing analysis (STA) after first levelizing said unrouted IC design, and further by breaking loops that create a directed acyclic timing graph.

5. The method of claim 1, further comprising using Cestimate representing a current estimated capacitance of said at least one net before routing to compute Cbound representing a maximum expected capacitance of said at least one net, including potential increases due to coupling or unexpectedly long wire routes, and wherein said Cbound is a function of said Cestimate excluding potential coupling or said long wire routes.

6. The method of claim 5, wherein said Cbound comprises potential increases in effective capacitance due to said coupling.

7. The method of claim 5, wherein said Cbound comprises potential increases in effective capacitance due to said long wire routes.

8. The method of claim 5 wherein

Cbound(Cestimate)=Cmin+K*Cestimate,

K and Cmin being parameters determined statistically for an arbitrary net with estimated capacitance Cestimate and actual effective capacitance Cactual that includes coupling and long wire routing effects, and K being a slope of a linear plot determined statistically by said Cactual and Cestimate, and wherein Cmin has a value set by said linear plot intercepting Cactual coordinate axis.

9. The method of claim 8, wherein a probability that Cbound(Cestimate).gtoreq.Cactual is greater than a predetermined threshold.

10. The method of claim 9, wherein said Cbound is determined as a balance between an over-design due to pessimistic estimations and escapes.

11. The method of claim 10, wherein said Cbound is fitted to capture characteristics of said wire routings and coupling probabilities.

12. The method of claim 11, wherein said Cbound is adjustable for different grounded and coupling capacitance per unit length estimates.

13. The method of claim 1 further comprising estimating said delay changes in downstream gates to propagated slew effects per unit change of said slew (dSlew).

14. The method of claim 13, wherein said propagated slew effects per unit change of said slew is a function of a sink Required Arrival Time (RAT) level, wherein said RAT level represents a maximum number of delay edges between said at least one sink and any of primary output pin of said IC design of any setup or hold constraint of an internal storage device of said IC design.

15. The method of claim 13, wherein said propagated slew effects per unit change of said slew are a function of expected derivative values of a gate output slew and gate delay with respect to a respective gate input slew.

16. The method of claim 1, further comprising determining from said TotalDeltaDelay and from a slack of said at least one sink whether to perform a timing optimization on said at least one net.

17. A system for computing in an unrouted integrated circuit (IC) design, timing effects and coupling effects, the unrouted IC design being described as a netlist including at least one net having a source and at least one sink, the system comprising:
   a) means for determining by using a computer, a delay change (TotalDeltaDelay) for least one sink of said at least one net, said delay change comprising propagation effects of slew degradation;
   b) means for determining whether a difference between said TotalDeltaDelay and a slack of said at least one sink is smaller than a threshold; and
   c) if said slack is smaller than said threshold, then means for modifying said unrouted IC design by at least of one of: i) decreasing the TotalDeltaDelay of said at least one sink, and ii) increasing said slack of said at least one sink, wherein said propagation effects of slew degradation comprises estimating delay changes in downstream gates, said estimation of downstream gate delay increasing when excluding propagating timing values from said at least one sink.

18. A program storage device readable by a machine, tangibly embodying a program of instructions executable by the machine to perform method steps for computing in an unrouted integrated circuit (IC) design timing effects and coupling effects, said unrouted IC design being described as a netlist including at least one net having a source and at least one sink, the method steps comprising:
   a) by using a computer, determining a change in delay (TotalDeltaDelay) detected at a sink of one of the interconnected nets of said unrouted IC circuit design, said delay change being caused by propagated slew degradation;
   b) determining whether said TotalDeltaDelay exceeds a slack at said sink by a predetermined limit and if it does not, then performing on said net a local optimization; and
   c) repeating steps a) and b) for each sink of each net of said unrouted IC circuit design until the TotalDeltaDelays of all nets are found to exceed the slacks of all of their sinks by said predetermined limit, wherein said propagation effects of slew degradation comprises estimating delay changes in downstream gates, said estimation of downstream gate delay increasing when excluding propagating timing values from said at least one sink.

* * * * *